United States Patent [19]
Nishioka et al.

[11] Patent Number: 5,684,454
[45] Date of Patent: Nov. 4, 1997

[54] ANTI-VEHICLE-THIEF APPARATUS

[75] Inventors: Futoshi Nishioka, Hiroshima; Tetsushi Hosokai; Atsushi Okamitsu, both of Kure; Yoshimasa Kitaki, Hiroshima, all of Japan

[73] Assignee: Mazda Motor Corporation, Hiroshima, Japan

[21] Appl. No.: 579,178

[22] Filed: Dec. 27, 1995

[30] Foreign Application Priority Data

Dec. 28, 1994 [JP] Japan ................................. 6-327423
Dec. 28, 1994 [JP] Japan ................................. 6-327424

[51] Int. Cl.$^6$ ................................................ B60R 25/10
[52] U.S. Cl. .............. 340/426; 340/825.3; 340/825.34; 340/825.54; 307/10.2; 361/171; 123/179.2
[58] Field of Search ................. 340/426, 425.5, 340/825.3, 825.31, 825.34, 825.54; 307/10.2, 10.4, 10.5; 364/431.03; 361/171; 123/179.2

[56] References Cited

U.S. PATENT DOCUMENTS

| | | | |
|---|---|---|---|
| 4,463,340 | 7/1984 | Adkins et al. | 340/64 |
| 4,965,460 | 10/1990 | Tanaka et al. | 340/543 |
| 4,982,072 | 1/1991 | Takigami | 235/384 |
| 5,245,330 | 9/1993 | Wassink | 340/825.3 |
| 5,422,632 | 6/1995 | Bucholtz et al. | 340/825.34 |
| 5,495,235 | 2/1996 | Durinovic-Johri et al. | 340/825.3 |

FOREIGN PATENT DOCUMENTS

| | | |
|---|---|---|
| 0 354 102 A1 | 7/1990 | European Pat. Off. . |
| 43 20 188 A1 | 12/1994 | Germany . |
| 2-279429 | 11/1990 | Japan . |
| 2 227 791 | 8/1990 | United Kingdom . |
| 2 266 747 | 11/1993 | United Kingdom . |
| WO 94/08823 | 4/1994 | WIPO . |

OTHER PUBLICATIONS

Revue Technique Automobile, *Nouvelle Petite Volkswagen*, Dec. 1, 1994, vol. 49, No. 568, pp. XXXVI–XLII.

Primary Examiner—Jeffery Hofsass
Assistant Examiner—Davetta Woods

[57] ABSTRACT

An anti-vehicle-thief apparatus having an immobilizer unit for comparing a specific first code received from a transponder to a stored code just after an engine is started, and when these codes are identical, outputting a second code to an EGI unit, the EGI unit for comparing the second code to a stored code, and when these codes are identical, permitting the engine to continue operation, a CPU for counting the number of times that an ignition switch power supply is turned ON and OFF during a code comparison time period, and backup RAM capable of storing the counted number of times that the ignition switch power supply is turned ON and OFF for a predetermined time period. When the ignition switch power supply is turned ON and OFF repeatedly more than a predetermined number of times, the EGI unit causes the engine to stop.

20 Claims, 11 Drawing Sheets 5,684,454

ANTI-VEHICLE-THIEF APPARATUS

BACKGROUND OF THE INVENTION

The present invention relates to an anti-vehicle-thief apparatus and, more particularly, to an anti-vehicle-thief apparatus which compares a specific code received from a transmitting unit to a code stored in a receiving unit just after an engine of an vehicle is started, and permits the vehicle to move only if those codes are identical so as to prevent the vehicle from being stolen.

Recently, burglaries of vehicles occur more frequently. In order to prevent burglaries, many types of anti-vehicle-thief apparatuses have been suggested, and actually mounted on vehicles. As for one of the aforesaid anti-vehicle-thief apparatus, there is a security system, disclosed in Japanese Patent Laid-Open No. 2-279429, which transmits an important coded function enable signal on the basis of an operation by a permitted user and rejects any operation, by a non-permitted third person, to transmit the function enable signal to an engine controller. In this system, if a thief enters a vehicle and turns on the ignition switch, the system does not allow the engine of the vehicle to start, thus it is possible to prevent vehicle theft committed by using known methods, such as a method using a duplicated key or directly connecting an electrical circuit, e.g., a starter motor.

Further, the applicant of the present invention has invented an anti-vehicle-thief apparatus, disclosed in the Japanese Patent Application No. 6-297086 on Nov. 30, 1994. This anti-vehicle-thief apparatus compares a specific first code received from a transmitting unit to a code stored in a receiving unit just after an engine 0 is started, then a second code is outputted to an engine controller, the second code and a code stored in an engine controller are compared. Then, if these codes are identical, the engine is permitted to operate, whereas if these codes are different, then the engine is stopped.

According to the aforesaid anti-vehicle-thief apparatus, in a case where the permitted user started the engine, the engine keeps moving, whereas in a case where a thief started the engine, the engine is stopped by comparing codes and finding an illegal operation. However, in a vehicle in which the aforesaid anti-vehicle-thief apparatus is provided, there is a fear that a thief may perform specific operations so as to prevent the engine from being stopped while the apparatus is comparing codes, keep the engine running, and steal the vehicle.

SUMMARY OF THE INVENTION

The present invention has been made in consideration of the above situation, and has as its object to provide an anti-vehicle-thief apparatus which compares a specific code received from a transmitting unit to a code stored in a receiving unit after the engine is started, thereby ensuring to prevent a vehicle, provided with the anti-vehicle-thief apparatus, from being stolen.

Another object of the present invention is to provide an anti-vehicle-thief apparatus using a backup RAM provided on an engine controller.

It is still another object of the present invention to provide an anti-vehicle-thief apparatus capable of preventing a vehicle from being stolen even while its engine is not warmed up.

According to the prevent invention, the foregoing object is attained by providing an anti-vehicle-thief apparatus comprising: code verification means for comparing a specific first code received from a sending unit to a code stored in receiving unit and, when these codes are identical, outputting a second code to engine control means; engine control means for comparing the second code to a code stored in the engine control means and, when these codes are identical, permitting an engine to operate; code comparison operation verification means, provided in the engine control means, for verifying whether or not it is possible to perform the code comparison by the engine control means or not; and engine stopping means for causing the engine to stop when it is determined that it is impossible to perform the code comparison.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

Figure 1:
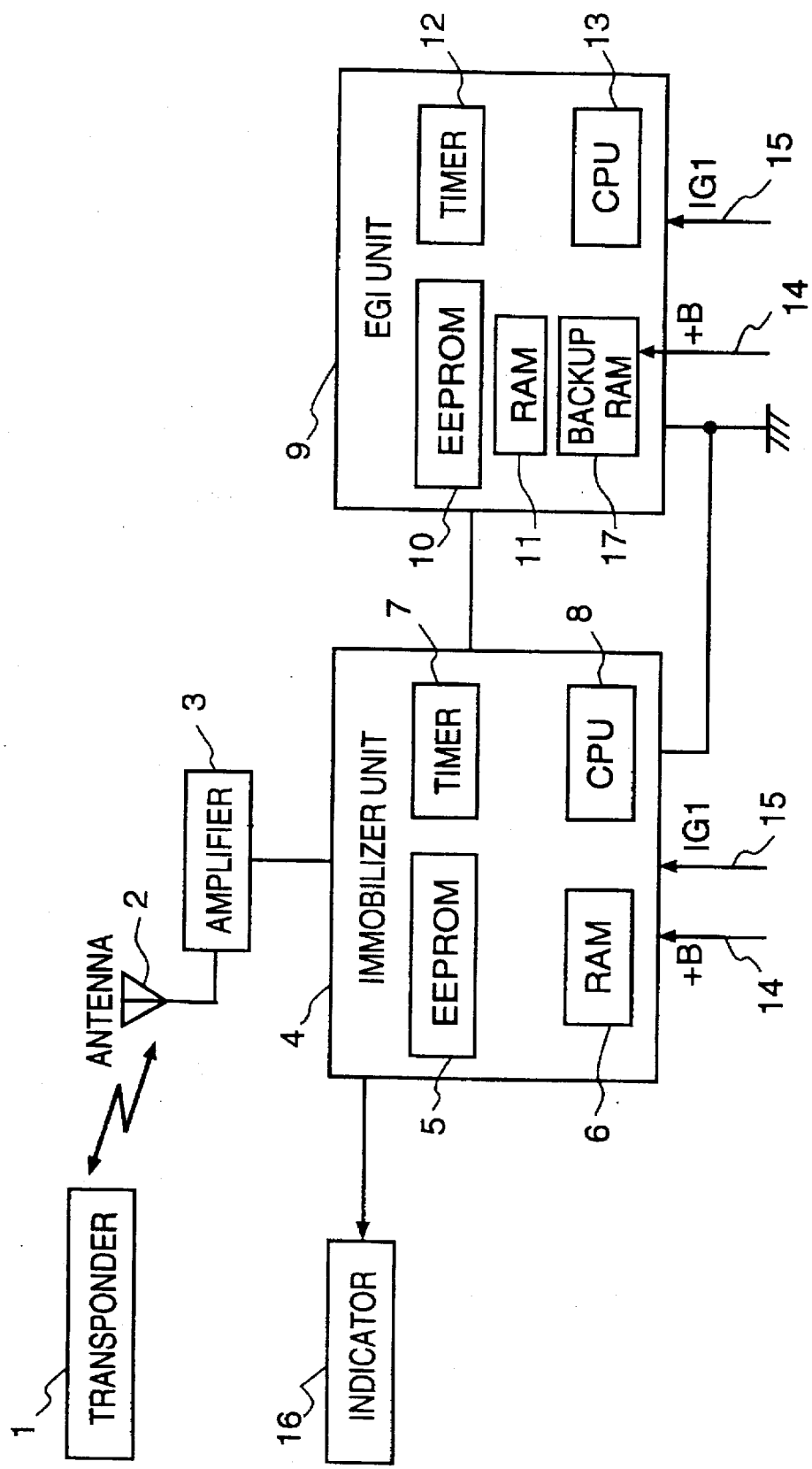
FIG. 1 is a block diagram of an anti-vehicle-thief apparatus according to an embodiment of the present invention.

Preferred embodiment of the present invention will be described in detail in accordance with the accompanying drawings. FIG. 1 is a system block diagram of an anti-vehicle-thief apparatus according to an embodiment of the present invention.

As shown in FIG. 1, the anti-vehicle-thief apparatus includes a transponder 1, an antenna 2 used for receiving a signal from the transponder 1, an amplifier 3 for amplifying the signal received by the antenna 2, an immobilizer unit 4 for processing in accordance with the amplified signal from the amplifier, and an EGI unit 9 for controlling the engine. More specifically, the transponder 1 is included in a key, used by a driver, for controlling ON and OFF of an ignition switch of the vehicle. The antenna 2 is the ignition coil antenna which is coupled to the ignition switch. The amplifier 3 amplifies the signal, when the coil antenna is operating and a voltage is applied, to a fixed voltage so as to obtain a high voltage.

The immobilizer unit 4 is a controller, developed in Europe for preventing vehicle theft, which prohibits the starting of the engine by using an EGI unit, and immobilizing function of the immobilizer unit 4 is automatically set by switching the ignition switch off when a user leaves the vehicle.

The immobilizer unit 4 is supplied with power from a battery (+B) (not shown) via a supply line 14 and a power supply (not shown) which supplies power to the ignition switch via a supply line 15. The power supply is referred as to an ignition switch power supply, hereinafter. The immobilizer unit 4 is provide with ON or OFF data of the ignition switch in accordance with the battery (+B) connected via the supply line 14 and the ignition switch power supply connected via the supply line 15 as well as ID data from the transponder 1 in accordance with the voltage amplified by the amplifier 3. Thereafter, the immobilizer unit 4 transmits a predetermined control signal to the EGI unit. Further, since the immobilizer unit 4 is connected to the battery via the supply line 14, when the engine is stopped and the ignition switch is turned off, the immobilizer unit 4 is kept supplied with electricity from the battery. Accordingly, the immobilizer unit 4 maintains a stand-by state. Furthermore, the immobilizer unit 4 is also connected to the indicator 16 which is provided within a vehicle, and it controls the ON and OFF of internal lights on the basis of the ID data sent from the transponder 1.

The EGI unit 9 is a controller which electronically controls the revolutions per minute of the engine, the amount of fuel injection, and the like.

A configuration of the EGI unit 9 is similar to that of the immobilizer unit 4, and comprises an EEPROM 10 for storing data in advance, RAM 11 for temporarily storing data during transmitting/receiving data to/from the immobilizer unit 4, a timer 12 which sends timing data of the transmission and reception of data stored in the above memories, and CPU 13 for controlling transmission and reception of data to/from the immobilizer unit 4 in accordance with the timing data from the timer 12. Further, the EGI unit 9 receives a predetermined control signal from the immobilizer unit 4 and controls the starter and the amount of fuel injection in accordance with the control signal. However, deferring from the immobilizer unit 4, the EGI unit 9 is connected only to the ignition switch power supply which is coupled with ON and OFF of the ignition switch, via the supply line 15 except for the backup RAM 17. Therefore, when the engine is stopped and the ignition switch is turned off, electricity is not supplied to the EGI unit 9.

Further, the EGI unit 9 includes a backup RAM 17. The backup RAM 17 stores trouble codes for sensors and the like, showing whether or not the sensors had any trouble in the past, and is used for trouble shooting. Therefore, the backup RAM 17 is always connected to the battery (+B). Furthermore, a static RAM is usually used as the backup RAM 17, which can keep the stored contents for a certain time period (about 10 msec to 2 sec.) after the battery is turned off by a condenser, or the like, which is provided in the power supply of the EGI unit.

Figure 2:
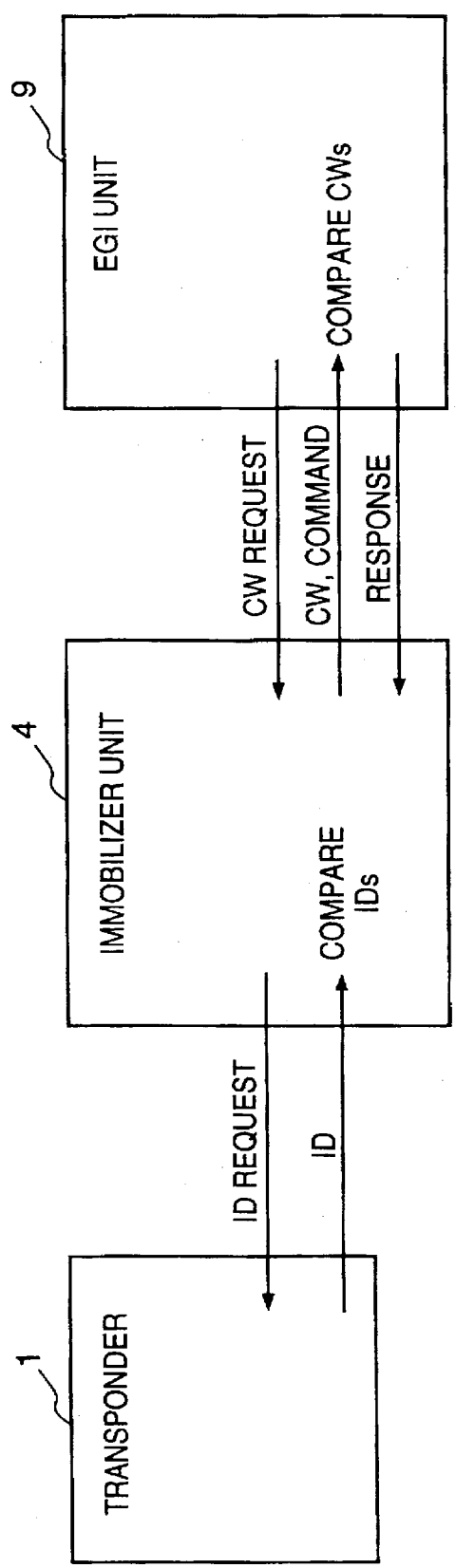
FIG. 2 is an explanatory view for explaining the verification procedure of an ID code and a code word of a transponder 1 having a specific ID data.

Next, referring to FIGS. 2 and 3, transmission and reception of data between the transponder 1, the immobilizer unit 4, and the EGI unit 9 will be described. FIG. 2 is an explanatory view of an verification procedure of ID data of the transponder 1 which is specific to the transponder 1. It should be noted that an ID code, i.e., a specific code assigned to a key, is transmitted from the transponder i to the immobilizer unit 4, and a password, called "code word" (referred as "CW", hereinafter), is transmitted from the immobilizer unit 4 to the EGI unit 9. The immobilizer unit 4 and the EGI unit 9 have prestored an identical CW.

<Verification and Registration of an ID Code>

Referring to FIG. 2, when the transponder 1 is inserted into the ignition keyhole and turned to a position where the engine is started, the EGI unit 9 issues a CW request to the immobilizer unit 4, in turn, the immobilizer unit 4 issues an ID request to the transponder 1. Then the transponder 1 sends an ID signal, which is used as a trigger signal for the immobilizer unit 4, to the immobilizer unit 4. The immobilizer unit 4 temporarily stores the sent ID code of the transponder 1 in RAM 6 in the immobilizer unit 4. Thereafter, an ID code, registered in an EEPROM 5 in the immobilizer unit 4, and the ID code sent from the transponder 1 are compared in CPU 8. If these ID codes are identical, the immobilizer unit 4 sends a signal to permit the engine to continue operating (immobilizing function cancellation command) and sends the CW to the EGI unit 9. Whereas, if the ID codes are different from each other, the immobilizer unit 4 sends a signal to stop the engine (immobilizing function set command), in turn, the EGI unit 9 stops the engine. The EGI unit 9 stores the CW sent from the immobilizer unit 4 in the RAM 11 and compares the CW to a CW registered in the EEPROM 10 in the EGI unit 9. If these CWs are identical, EGI unit 9 keeps the engine moving, whereas if not, stops the engine.

Figure 3:
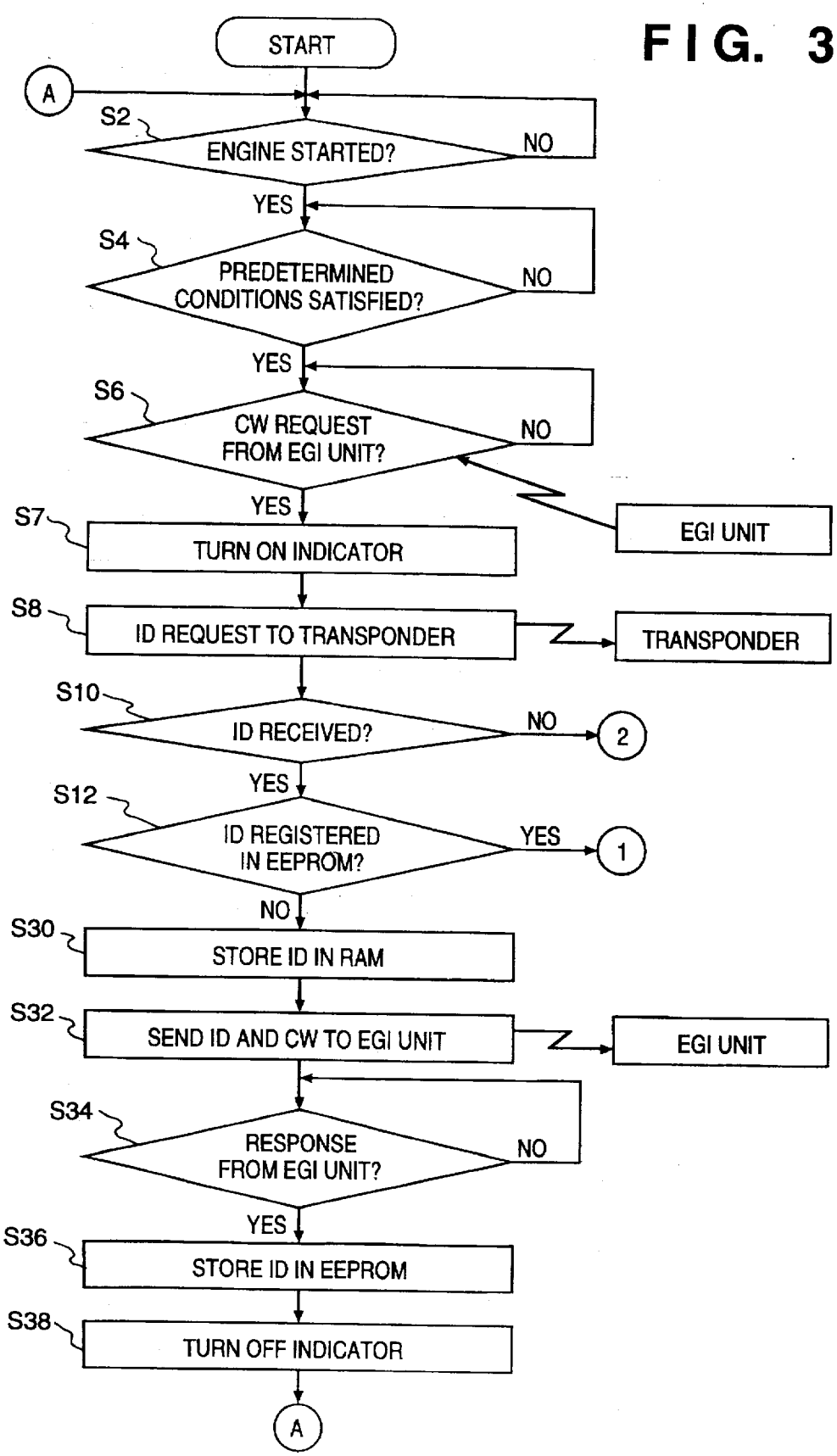
FIG. 3 is a flowchart showing the verification procedure of the ID code in the immobilizer unit.
Figure 4:
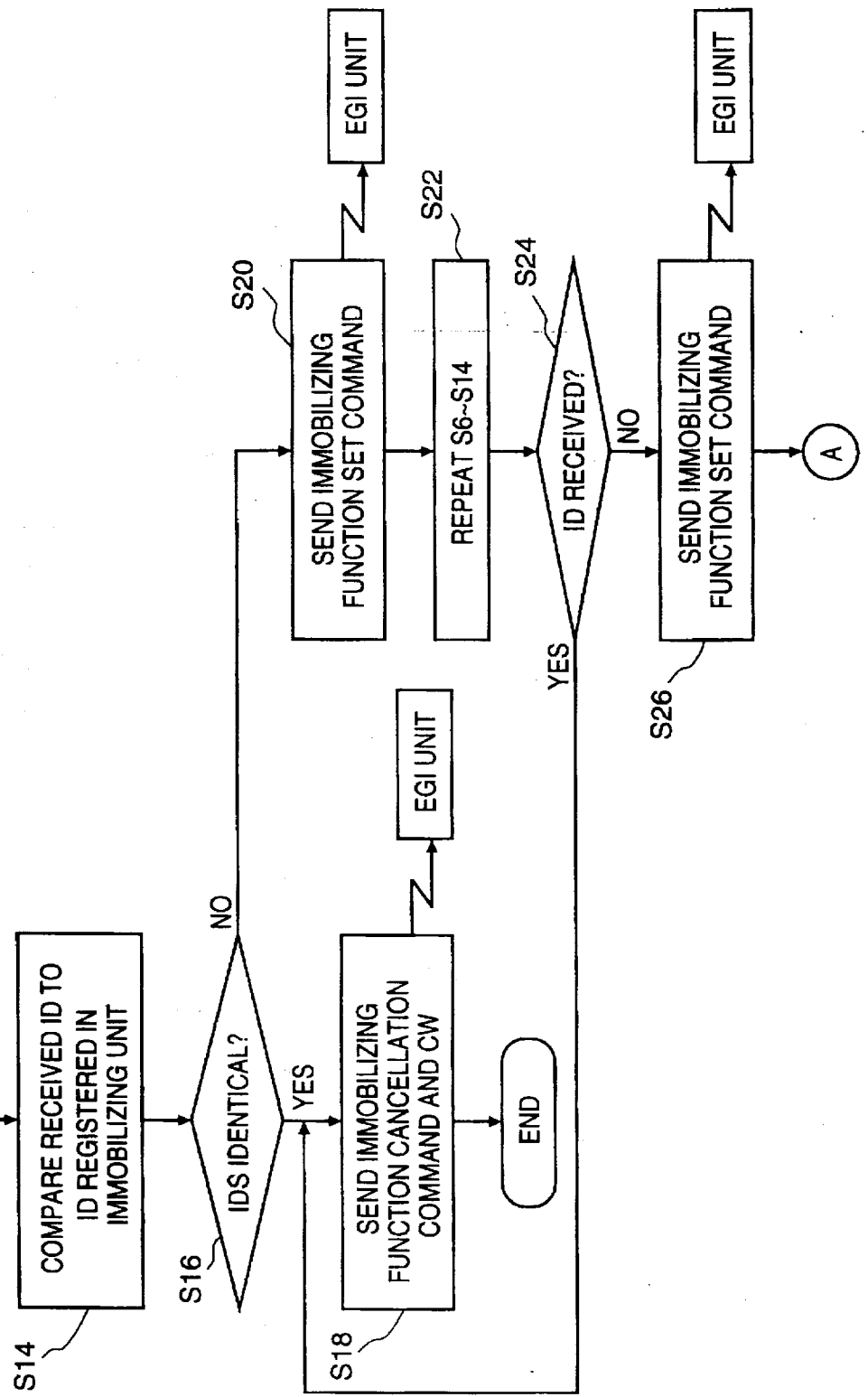
FIG. 4 is a configuration flowchart showing the verification procedure of the ID code in the immobilizer unit.
Figure 5:
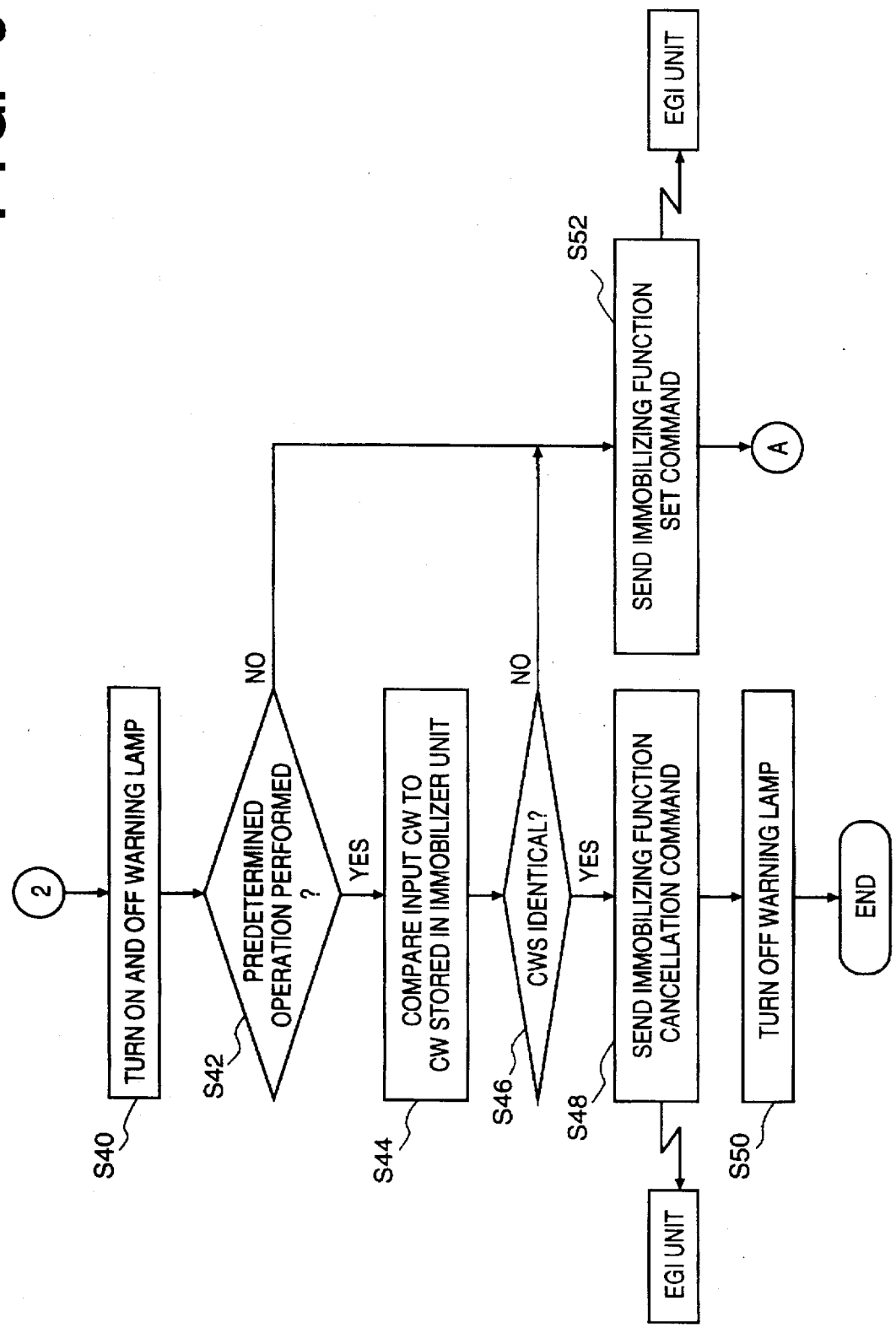
FIG. 5 is a flowchart showing the verification procedure of the ID code in the immobilizer unit when the ID code can not be transmitted.

FIGS. 3 to 5 are flowcharts showing the verification sequence of the ID code in an immobilizer unit. As shown in FIGS. 3 and 4, when the process is started and the ignition switch is moved to the ON position by a key having a transponder inside, the immobilizer unit waits for judgment for immobilizer function cancellation, and is in a mode of permitting an engine to start temporarily. At step S2, whether the ignition switch is turned to the position to start the engine by the key including the transponder inside, and whether the engine is started or not is determined When it is determined that the engine has started (YES at step S2), the process proceeds to step S4. Whereas when it is determined that the engine has not started (NO at step S2), then the process returns to the beginning of the process. At step S4, whether or not predetermined conditions (whether or not the engine is in a stable state in which 500 rpm and a voltage of greater or equal to 10V) are satisfied is determined. If the conditions are satisfied (YES at step S4), the process proceeds to step S7 where an indicator is turned on, then further proceeds to step S6. In contrast, if they are not satisfied (NO at step S4), the process returns to the beginning of step S4. At step S6, whether or not an CW request is issued by the EGI unit is determined. When it is determined that the CW request is issued, (YES at step S6), the process moves to step S8. Whereas if it is determined that the CW request is not issued (NO at step S6), the process returns to the beginning of step S6. Thereafter at step S8, in response to the CW request at step S6, the ID request is issued to the transponder. Then, the process proceeds to step S10 where whether an ID code is received from the transponder to which the ID request is issued or not is determined. If it is (YES at step S10), the process proceeds to step S12, whereas if it is not (NO at step S10), the process proceeds to step S40, which will be described later.

At step S12, whether or not any ID code is registered in the EEPROM provided in the immobilizer unit is determined. If it is determined that no ID code is registered in the EEPROM of the immobilizer unit (NO at step S12), the process proceeds to step S30. At step S30, the ID code is temporarily stored in the RAM of the immobilizer unit, thereafter, the ID code and CW are sent to the EGI unit together with an ID unregistered command (IE command) at step S32. The process goes to step S34 where whether there is any response to the ID code and CW transmission, from the EGI unit or not is determined. If there is (YES at step S34), then the process proceeds to step S36, where if the response from the EGI unit indicates that the ID code of the transponder and the ID code registered in the EGI unit are identical, the ID stored in the RAM of the immobilizer unit is registered in the EEPROM, then at step S38, the indicator is turned off. Whereas, if there is no response from the EGI unit (NO at step S34), the process returns to the beginning of step S34.

Further, when it is determined that the ID code is registered in the EEPROM of the immobilizer unit at above step S12 (YES at step S12), the process proceeds to step S14 in FIG. 4. At step S14, the ID code sent from the transponder is compared to the ID code registered in the immobilizer unit. At step S16, whether these ID codes are identical or not is determined, and if they are (YES at step S16), then the process moves to step S18, whereas if they are not (NO at step S16), the process moves to step S20. At step S18, the immobilizer unit sends an immobilizing function cancellation command and a CW to the EGI unit, and the process is over.

Further, in a case of NO at step S16, the process moves to step S20 where the immobilizing function set command is sent to the EGI unit. Thereafter, at step S22, the processes at steps S6 to S14 are repeated once more. Then at step S24, whether the ID code sent from the transponder and the ID code registered in the immobilizer unit are identical or not is determined once again. If they are identical (YES at step S24), the process moves to step S18, and if they are not (NO at step S24), the process goes to step S26 where the immobilizing unit sends an immobilizing function set command to the EGI unit once again, then the process returns to step S2 in FIG. 3. It should be noted that the immobilizing function is automatically set by turning off the ignition switch, thus, if the immobilizing function is not canceled, then the anti-vehicle-thief apparatus of this embodiment is in a state in which the immobilizing function is set, or in a state of waiting for the immobilizing function being canceled, as described above. In other words, the immobilizing function set command sent at step S26 and following step S52 is actually a command for maintaining a state where the immobilizing function is set.

<Procedure of Verifying ID Code in the Immobilizer Unit When Transmission of ID Code is Not Possible>

Next, a procedure of verifying an ID code when the ID code can not be transmitted to an immobilizer unit, such as a case where a transponder is out of order will be described. If the transponder i is out of order and can not transmit the ID code, the immobilizer unit 4 first warns a user (driver) that it is impossible to receive the ID signal from the transponder 1 or that the ID signal can not be read, by blinking a warning lamp, or the like. Accordingly, the user (driver) recognizes that there is something wrong with the transponder 1. Note that the situation that the ID signal can not be received or read indicates either a state that the ID code is not transmitted or a state that a signal wave of the transmitted ID code is deteriorated.

FIG. 5 is a flowchart showing a procedure of verifying an ID code in the immobilizer unit when the ID code can not be transmitted. When an ID is not received from the transponder at step S10 in FIG. 3 (NO at step S10), the process moves to step S40 in FIG. 5. At step S40, it is determined that ID code can not be transmitted, and the warning lamp is blinked so as to warn the driver that the transponder is out of order or there is something wrong with a communication line (between an antenna and the immobilizer unit), that the communication line is disconnected. Thereafter the process proceeds to step S42 where whether a CW is inputted by the driver by performing other predetermined operation by using the ignition switch or not is determined. If it is (YES at step S42), the process proceeds to step S44 where a CW registered in the EEPROM in the immobilizer unit is compared to the CW inputted by performing predetermined operation. At step S48, whether these CWs are identical or not is determined, and if they are (YES at step S46), the process goes to step S48 where an immobilizing function cancellation command and the CW are sent to the EGI unit. On the other hand, if it is determined that the CWs are not identical at step S46 (NO at step S46), the process moves to step S52 where the immobilizing function set command is sent to the EGI unit, then the process returns to step S2 in FIG. 3. Further, when it is determined that no CW is inputted by performing a predetermined operation at aforesaid step S42 (NO at step S42), the process goes to step S52 and the immobilizer unit sends the immobilizing function set command to the EGI unit.

After the immobilizing function cancellation command and the CW are transmitted at step S48, the warning lamp is turned off at step S50.

<Procedure of Verifying a CW in the EGI Unit>

Figure 6:
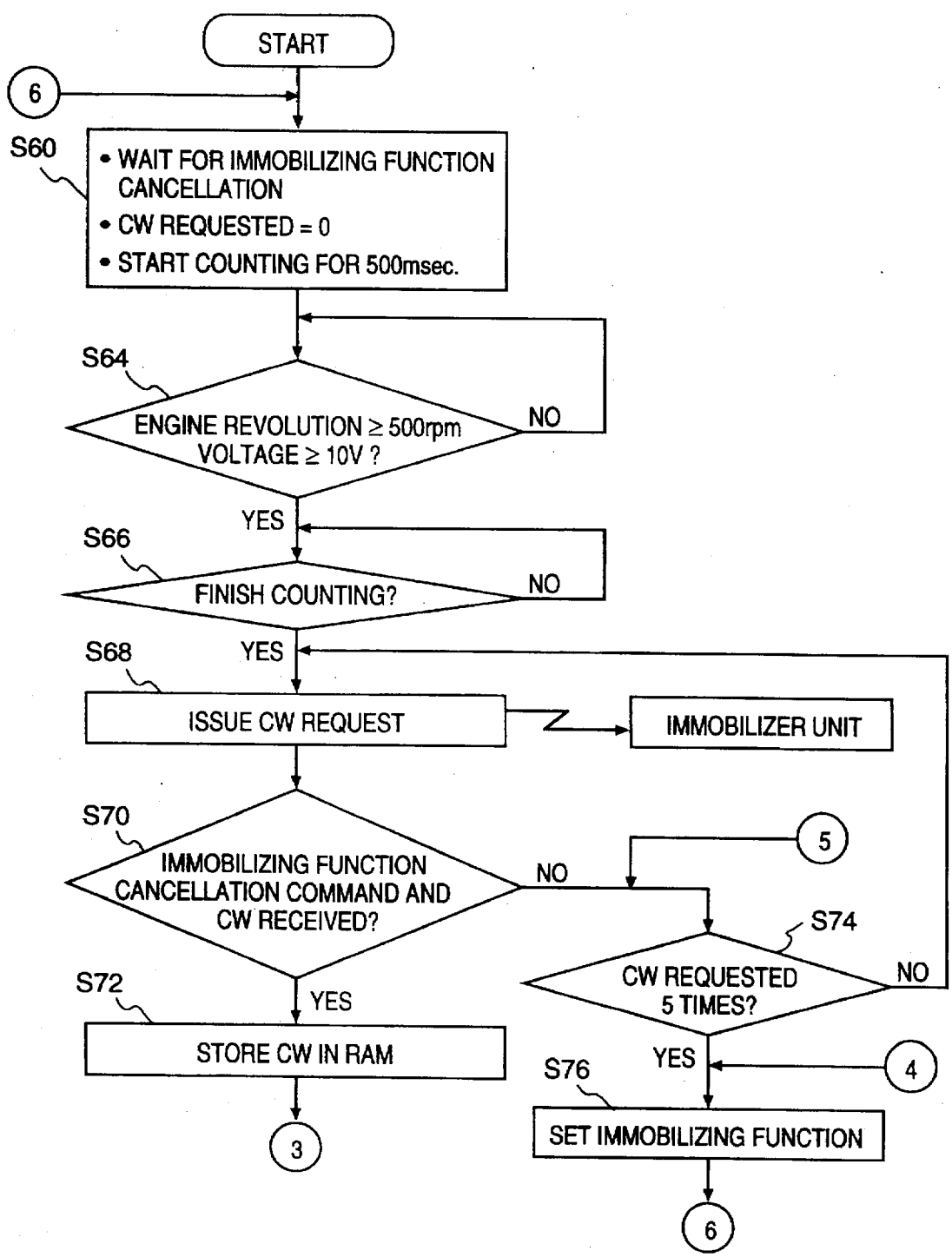
FIG. 6 is a flowchart showing the verification procedure of the ID code in an electric gasoline injection control (EGI) unit.
Figure 7:
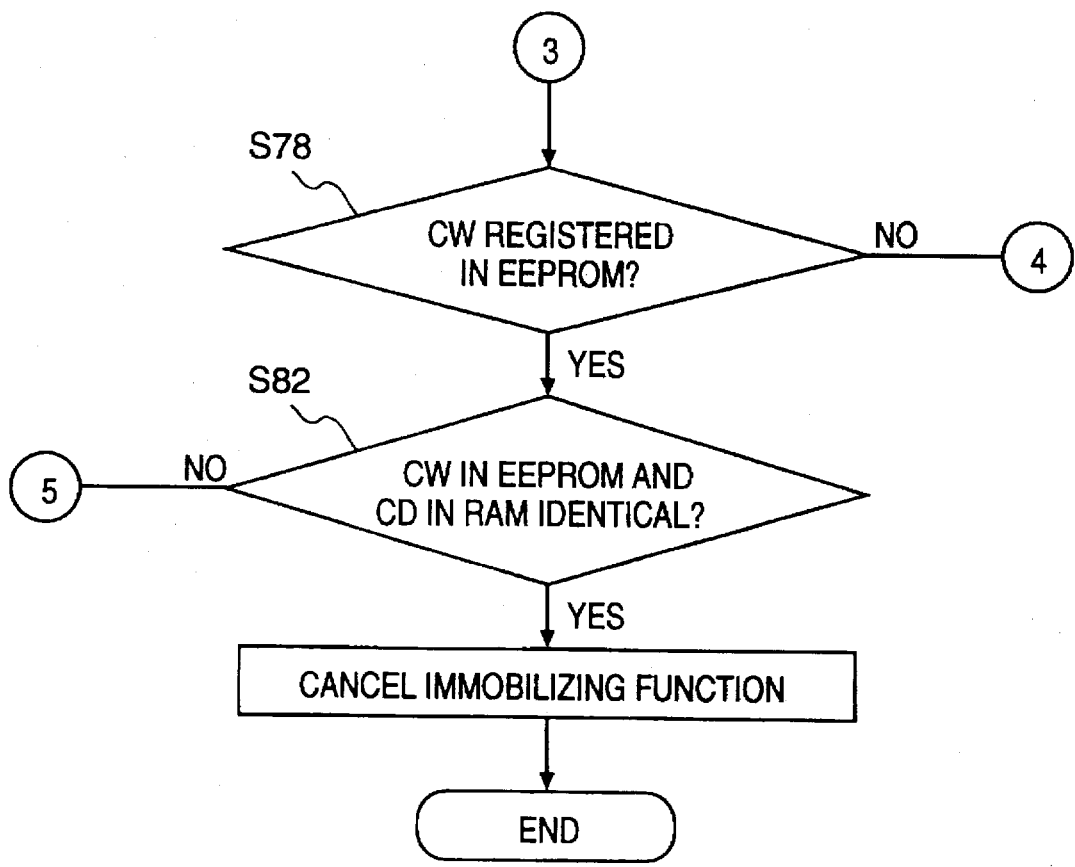
FIG. 7 is a flowchart showing the verification procedure of the ID code in the EGI unit.

Next, a procedure of verifying a CW in the EGI unit will be described. FIGS. 6 and 7 are flowcharts showing a procedure of verifying a CW in the EGI unit. Referring to FIGS. 6 and 7, when the process is started, a timer starts counting from the time the ignition is turned on to 500 msec. During this period, the EGI unit waits for judgment of immobilizing function cancellation and a CW request to be sent to the immobilizer unit at step S60.

Next, the process moves to step S64 where whether engine revolution is greater or equal to 500 rpm and voltage is greater or equal to 10V, as predetermined conditions, or not is determined. If the predetermined conditions are satisfied (YES at step S64), the process proceeds to step S66, whereas if the conditions are not satisfied (NO at step S64), the process returns to the beginning of step S64. At step S66, whether the counting of 500 msec., started at step S60, has been finished or not is determined. If it has (YES at step S66), then the process proceeds to step S68, whereas if it has not (NO at step S66), then the process returns to the beginning of step S66. At step S68, the EGI unit issues a CW request to the immobilizer unit. Thereafter, the process proceeds to step S70 where whether the immobilizing function cancellation command and the CW are received from the immobilizer unit to the EGI unit or not is determined. When it is determined that the immobilizer unit responded with the immobilizing function cancellation command and the CW at step S70 (YES at step S70), the process proceeds to step S72 where the CW is temporarily stored in the RAM 11 of the EGI unit. Thereafter, the process moves to step S78 in FIG. 7 where whether a CW is registered in the EEPROM of the EGI unit or not is determined. If it is (YES at step S78), the process proceeds to step S82 where whether the CW temporarily stored in the RAM is identical to the CW registered in the EEPROM of the EGI unit or not is determined. If the CWs are identical (YES at step S82), the process proceeds to step S84 where the immobilizing function is canceled and normal EGI is performed. On the contrary, if it is determined that the CWs are different at step S82 (NO at step S82), the process returns to step S74.

Whereas, when it is determined that the immobilizer unit has not responded with the immobilizing function cancellation command and the CW at step S70 (NO at step S70), the process moves to step S74 where whether the CW request has been issued to the immobilizer unit five times or not is determined. If it has (YES at step S74), the process proceeds to step S76 where the anti-vehicle-thief apparatus determines that it is out of order or that the vehicle is about to be stolen, and sets the immobilizing function and stops the engine. Whereas, if it is determined that the CW request has not been issued five times at step S74 (NO at step S74), the process returns to step S68, and the EGI unit issues a CW request to the immobilizer unit once again.

Figure 8:
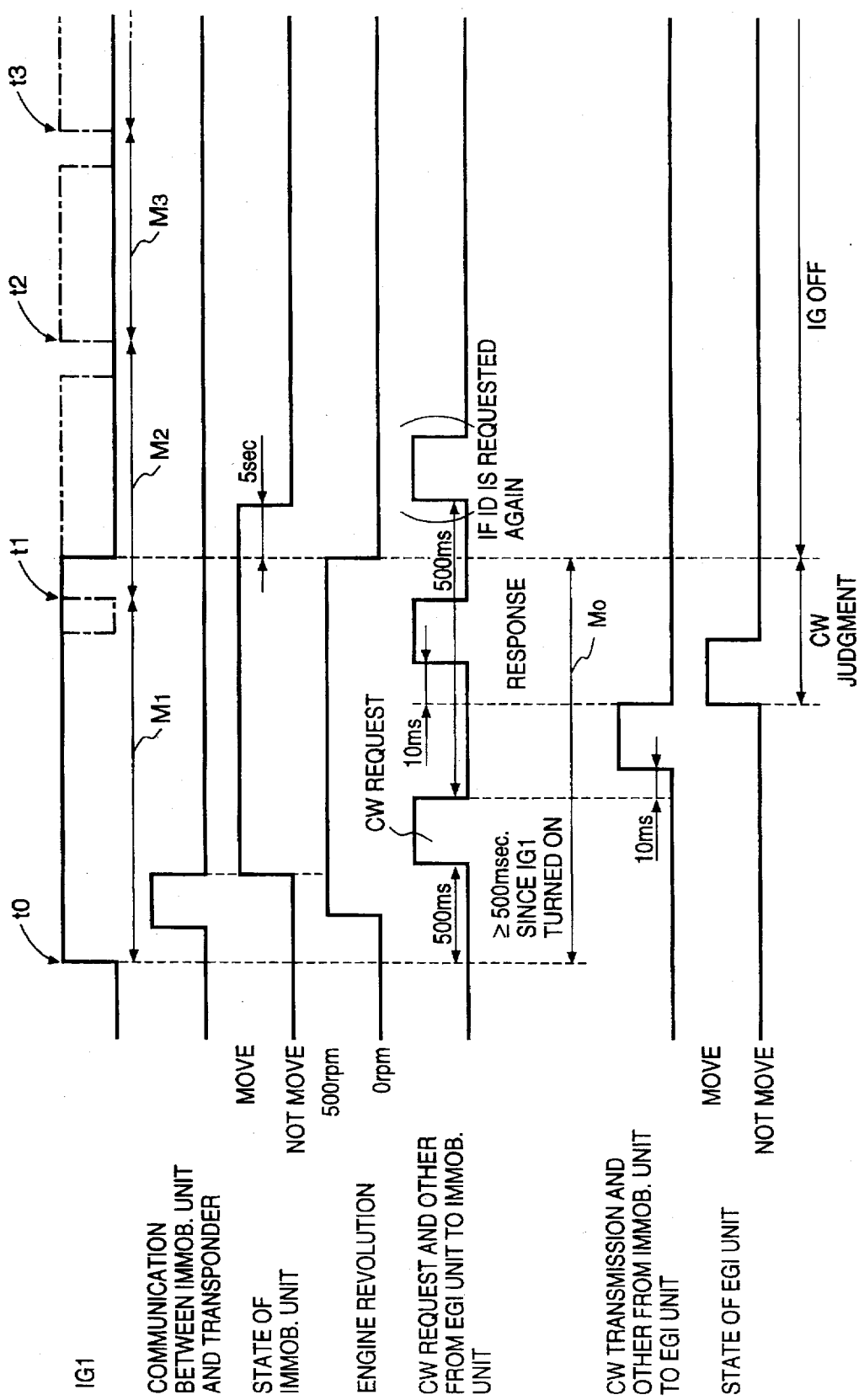
FIG. 8 is a timing chart showing timing of operations of a transponder, an ignition switch, an immobilizer unit, and an EGI unit in ID and CW code verification procedures.

FIG. 8 is a timing chart of each operation in the transponder, the ignition switch, the immobilizer unit, and the EGI unit in the ID code determination procedure. Referring to FIG. 8, communication between the immobilizer unit and the transponder begins after the number of engine revolution becomes greater or equal to 500 rpm and 500 msec. has passed since the ignition switch (power source line IG1) is turned on.

<Verification Procedure for Preventing Vehicle Theft by Performing Code Comparison by the EGI Unit>

Next, a procedure of verifying for preventing vehicle theft when a burglar is trying to steal a vehicle, by prohibiting code comparison process by the EGI unit will be described with reference to FIGS. 9 and 10.

Figure 9:
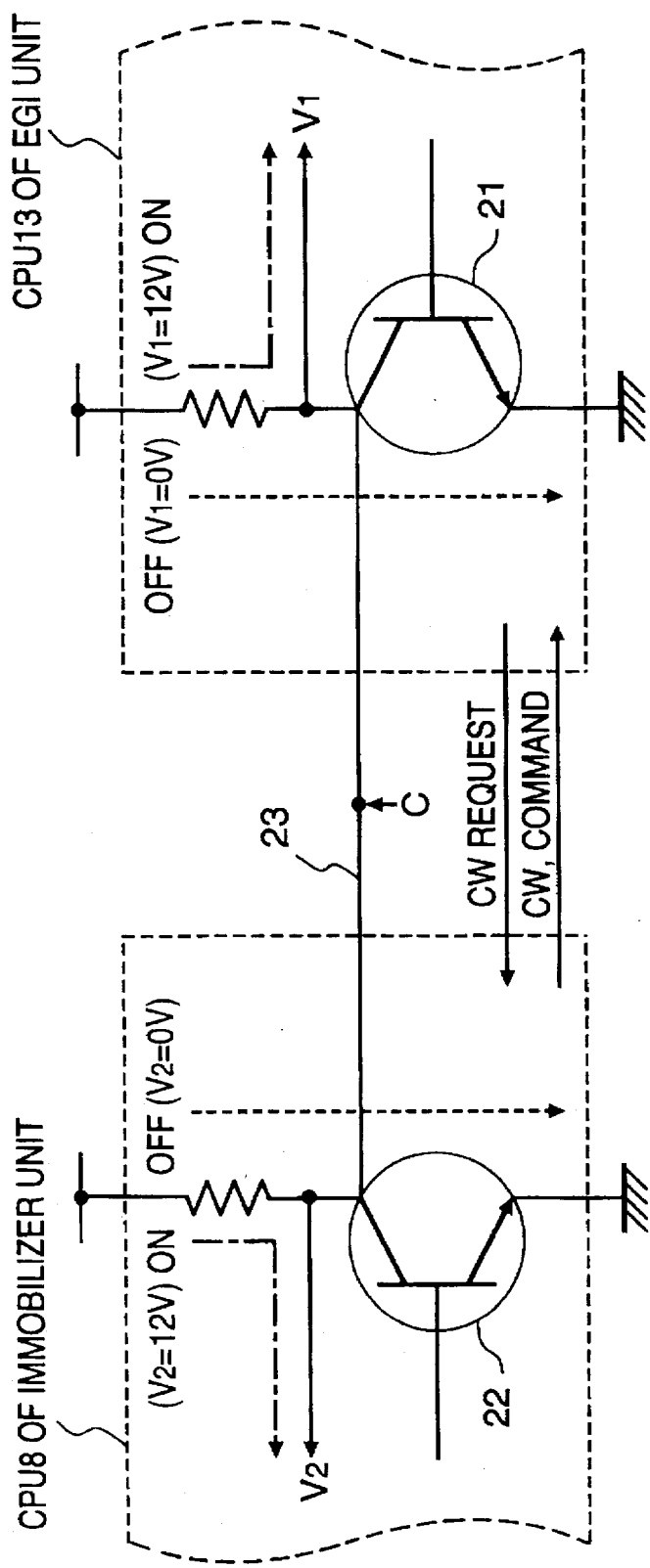
FIG. 9 shows parts of circuits of CPUs of the EGI unit and the immobilizer unit.

FIG. 9 shows parts of circuits of the CPU 13 of the EGI unit and the CPU 8 of the immobilizer unit. The CPU 13 of the EGI unit and the CPU 8 of the immobilizer unit are provided with transistors 21 and 22, respectively, and the CPU 13 of the EGI unit and the CPU 8 of the immobilizer unit are connected through a communication line 23.

Referring to FIG. 9, how to communicate between the CPU 13 of the EGI unit and the CPU 8 of the immobilizer unit will be explained. The CPU 13 of the EGI unit switches a base voltage of the transistor 21 HIGH and LOW, thereby making the communication line 23 be an ON state (communicable state) and an OFF state (incommunicable state). More specifically, a voltage V1 in a collector is 0 volt (V1=0 V) when the base voltage is HIGH, thus in the OFF state, whereas the voltage V1 is 12 volts (V1=12 V) when the base voltage is LOW, thus in the ON state. Similarly, by switching the base voltage of the transistor 21 of the CPU 13 of the EGI unit HIGH or LOW, the ON state and the OFF state can be produced. A signal is sent to the immobilizer unit by using combinations of these HIGH and LOW states. Further, when the communication line 23 is in the ON state since the base voltage of the transistor 21 of the CPU 13 of the EGI unit is LOW, the CPU 13 of the EGI unit can receive a signal from the immobilizer unit. Unless the communication line 23 is in the ON state, the CPU 13 of the EGI unit can not receive a signal from the immobilizer unit, and this state is called that the communication line 13 is in a "busy" state.

The operation of the transistor 22 of the CPU 8 of the immobilizer unit is similar to the operation of the transistor 21 of the CPU 13 of the EGI unit.

Next, various kinds of operations which makes code comparison impossible are described. Specifically, the following three operation may be considered to make code comparison impossible.

First, the communication line 23 is grounded at a point denoted by C. Accordingly, the transistor 21 of the CPU 13 of the EGI unit is always in the OFF state (V1=0 V), thereby the communication line 23 becomes the busy state, as described above. Thus, it becomes impossible to communicate from the CPU 8 of the immobilizer unit to the CPU 13 of the EGI unit. As a result, it becomes impossible to compare codes (first case).

Second, the communication line 23 is disconnected at the point C. Accordingly, the transistor 21 of the CPU 13 of the EGI unit is always in the ON state (V1=12 V). This state corresponds to a state in which it is possible for the CPU 13 of the EGI to receive a signal from the immobilizer unit, however, since the communication line 23 is disconnected, physically, communication becomes impossible. As a result, it becomes impossible to compare codes (second case).

Third, the communication line 23 is momentarily grounded at the point C, and this operation is repeated. In this case, noises occur on the communication line 23 because the communication line 23 is momentarily grounded, and code comparison is interrupted. Since the interruption of code comparison is repeated, it becomes impossible to finish the code comparison. As a result, it becomes impossible to compare codes (third case).

Figure 10:
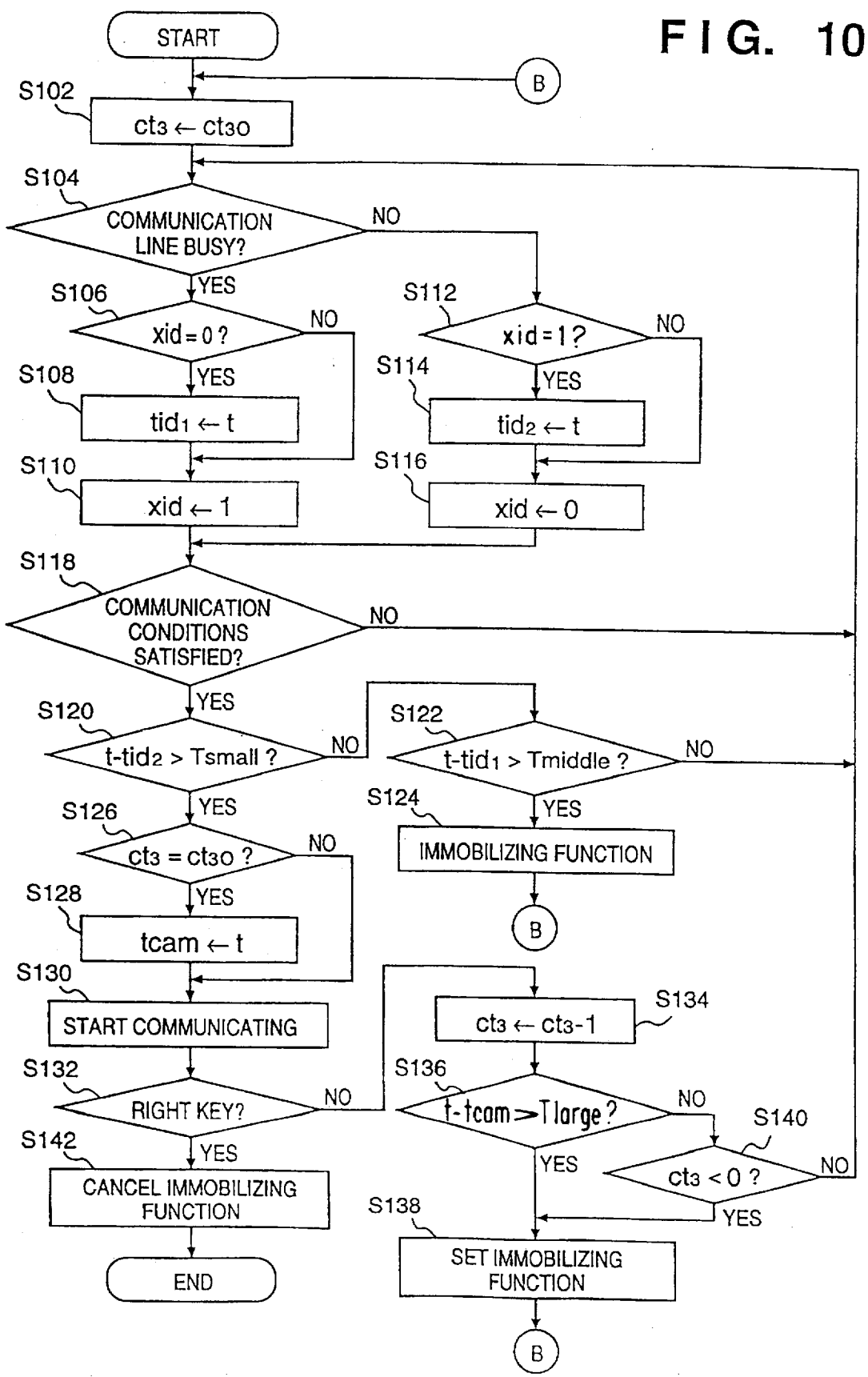
FIG. 10 is a flowchart showing anti-vehicle-thief verification procedure performed by the EGI unit corresponding to an operation which makes impossible to compare code words.

According to the embodiment of the present invention, by performing a verification procedure for preventing vehicle theft shown in FIG. 10, if a thief performs aforesaid operation, it is possible to certainly prevent the vehicle from being stolen.

Referring to FIG. 10, first at step S102, a counter $ct_3$ is set to $ct_30$. For example, in the aforesaid second case, the EGI unit issues a CW request to the immobilizer unit, however, no respond can be obtained because of disconnection of the communication line 23. Accordingly, the EGI unit results in issuing the CW request to the immobilizer unit repeatedly. In this embodiment, if the code comparison has not finished after the CW request is issued a predetermined number of times, the engine is caused to stop. $ct_30$ is an initial value that represents the predetermined number of times, and the counter $ct_3$ corresponds to "initial value—the number of times a CW request is issued".

Next at step S104, whether the communication line is busy or not is determined. If it is busy, the process proceeds to step S106 where whether "xid" is 0 or not is determined. The xid is a flag indicating whether the communication line was busy or not. Therefore, xid=0 indicates that the communication line was not busy, and xid=1 indicates that the communication line was busy previously. If it is determined that the communication line was not busy at step S106, then at step S108, a timer $tid_1$ is set to the current time t, further at step S110, the flag xid is set to 1. Further, it is determined that the communication line was busy in the past, process passes step S108 and moves to step S110, and the flag xid is again set to 1.

On the contrary, if it is determined that the communication line is not busy at step S104, then whether or not xid=1 is determined at step S112. If it is, it is known that the state of the communication line changed from busy to not busy. Accordingly, the process proceeds to step S114 where the timer $tid_2$ is set to the current time t, further the flag xid is set to 0 at step S116. Whereas, if it is determined that the communication line has not been busy at step S112, the process passes step S114 and moves to step S116 where the flag xid is set to 0.

As described above, when the communication line becomes busy for the first time, a timer $tid_1$ is set to the time t when the communication line becomes busy, and time after the time t is counted. In contrast, when the communication line becomes not busy for the first time, the timer $tid_2$ is set to the time t when the communication line becomes not busy, and time after the time t is counted.

Next at step S118, whether communication conditions are satisfied or not is determined. Specifically, it is determined that the communication conditions are satisfied if the number of engine revolution is greater or equal to 500 rpm. Next at step S120, whether a time interval between the time when the communication line becomes not busy for the first time (a state in which the EGI unit can receive a signal from the immobilizer unit) and the current time, namely t-tid, is longer than a predetermined time period, Tsmall, is determined.

If it is determined that $t-tid_2$ is less than Tsmall at step S120, it can be considered that the aforesaid first case is occurring. Thus the process proceeds to step S122 where whether a time interval, $t-tid_1$, between the time when the communication line becomes busy for the first time (a state in which the EGI unit can not receive a signal from the immobilizer unit) and the current time is longer than a predetermined time period, Tmiddle, or not is determined. If $t-tid_1$ is longer than the Tmiddle, then it is considered that the first case may be occurring. Then the process proceeds to step S124 where the immobilizing function is set and the engine is caused to stop.

Next at step S120, if $t-tid_2$ is longer than the predetermined time period Tsmall, then the process moves to step S126 where whether the value of a counter $ct_3$ is the same as the initial value $ct_30$, set at step S102, or not is determined. In other words, whether the EGI unit has issued the CW request to the immobilizer unit more than once after the communication conditions are satisfied. When it is determined that $ct_3=ct_30$, namely the EGI unit has not issued the CW request to the immobilizer unit at all, the process proceeds to step S128 where a timer tcam is set to the current time t. Thereby, the time after the current time is counted. Then, the step proceeds to step S130, and communication begins.

Next the process proceeds to step S132, whether the used key is the correct key or not is checked. The procedure for checking the key at step S132 is substantially the same as those of steps S60 to S84 in FIGS. 6 and 7, thus explanations of the procedure is omitted.

Next, in a case where the used key is not identified as the correct key by the key comparison procedure, the process proceeds to step S134. At step S134, each time when the EGI unit issues the CW request to the immobilizer unit, the value of the counter $ct_3$ is decremented by 1. Thereafter, the process proceeds to step S136 where whether t-tcam, a time period since the first time the EGI unit issued the CW request to the current time, is greater than a predetermined time period, Tlarge, or not is determined. If t-tcam is larger than the predetermined time period Tlarge, it can be considered that the aforesaid third case may be occurring. Thus, the process proceeds to step S138, the immobilizing function is set, and the engine is caused to stop.

Whereas, if it is determined that t-tcam is less than the predetermined time period Tlarge at step S136, namely the predetermined time period has not passed yet since the EGI unit issued the first CW request to the immobilizer unit, the process moves to step S140 where whether the counter value, $ct_3$, is smaller than 0 or not is determined. If the counter value $ct_3$ is smaller than 0, the EGI unit have issued the CW request more than the predetermined number of times that is set as the initial value. More specifically, it is considered that the aforesaid second case may be occurring. Therefore, in such a case, the process goes to step S138 where the immobilizing function is set and the engine is caused to stop.

When it is determined that the used key is the right key at step S132, the process moves to step S142 where the immobilizing function is canceled.

Note that the aforesaid predetermined time periods, Tlarge, Tmiddle, and Tsmall, shown in the flowchart in FIG. 10, have relationship of Tlarge>Tmiddle>Tsmall.

According to the anti-vehicle-thief apparatus according to the embodiment as described above, by connecting the communication line 23 to the ground at a point (first case), the communication line 23 is made always busy, thereby making communication from the CPU 8 of the immobilizer unit to the CPU 13 of the EGI unit impossible. As a result, it becomes impossible to perform the code comparison, thus it is possible to prevent a thief from keeping the engine of a vehicle in operation, thereby preventing the vehicle from being stolen (first case).

Further, according to the anti-vehicle-thief apparatus according to the embodiment, by disconnecting the communication line 23, communication is physically prevented (note, the transistor 21 of the CPU 13 of the EGI unit is always ON state (V1=12 V), which indicates that the CPU 13 of the EGI unit is in a state that it can receive a signal from the immobilizer unit), it becomes impossible to perform the code comparison, thus it is possible to prevent a thief from keeping moving the engine of a vehicle, thereby preventing the vehicle from being stolen (second case).

Furthermore, according to the anti-vehicle-thief apparatus according to the embodiment, by connecting the communication line 23 momentary to ground at a point, repeating this operation, and resetting the code comparison after each operation so as to interrupt code comparison procedure, it is possible to prevent a thief from keeping the engine of a vehicle in operation, thereby surely preventing the vehicle from being stolen (third case).

<Verification Procedure for Preventing Vehicle-Thief Performed by the EGI Unit by Using the Ignition Switch Power Supply>

Next, referring to FIGS. 8 and 11, a verification procedure for preventing vehicle theft performed by the EGI unit by using the ignition switch power supply will be described. As described above, in a vehicle on which the anti-vehicle-thief apparatus is mounted, the engine of the vehicle is started, and if it is ensured that the correct key was used to start the engine, then the engine is kept moving, whereas if it is determined that an incorrect method was used to start the engine, then the engine is stopped after checking codes so as to find illegal operation of the vehicle. However, there is a fear that a thief turns on and off an ignition switch power supply momentary by performing some special operations, e.g., to keep engine continue rotating by using inertia of the engine by momentary shutting the ignition switch power supply (shown as a dot-dash-line of IG1 in FIG. 8), during the anti-vehicle-thief apparatus is comparing codes just after the engine is started, and prevents the immobilizing function from being set, thereby stealing the vehicle. As for a battery, the same operation for the ignition switch power supply as described above is possible. Therefore, similar procedure to the following procedure for the ignition switch power supply can also be applied to the battery.

Figure 11:
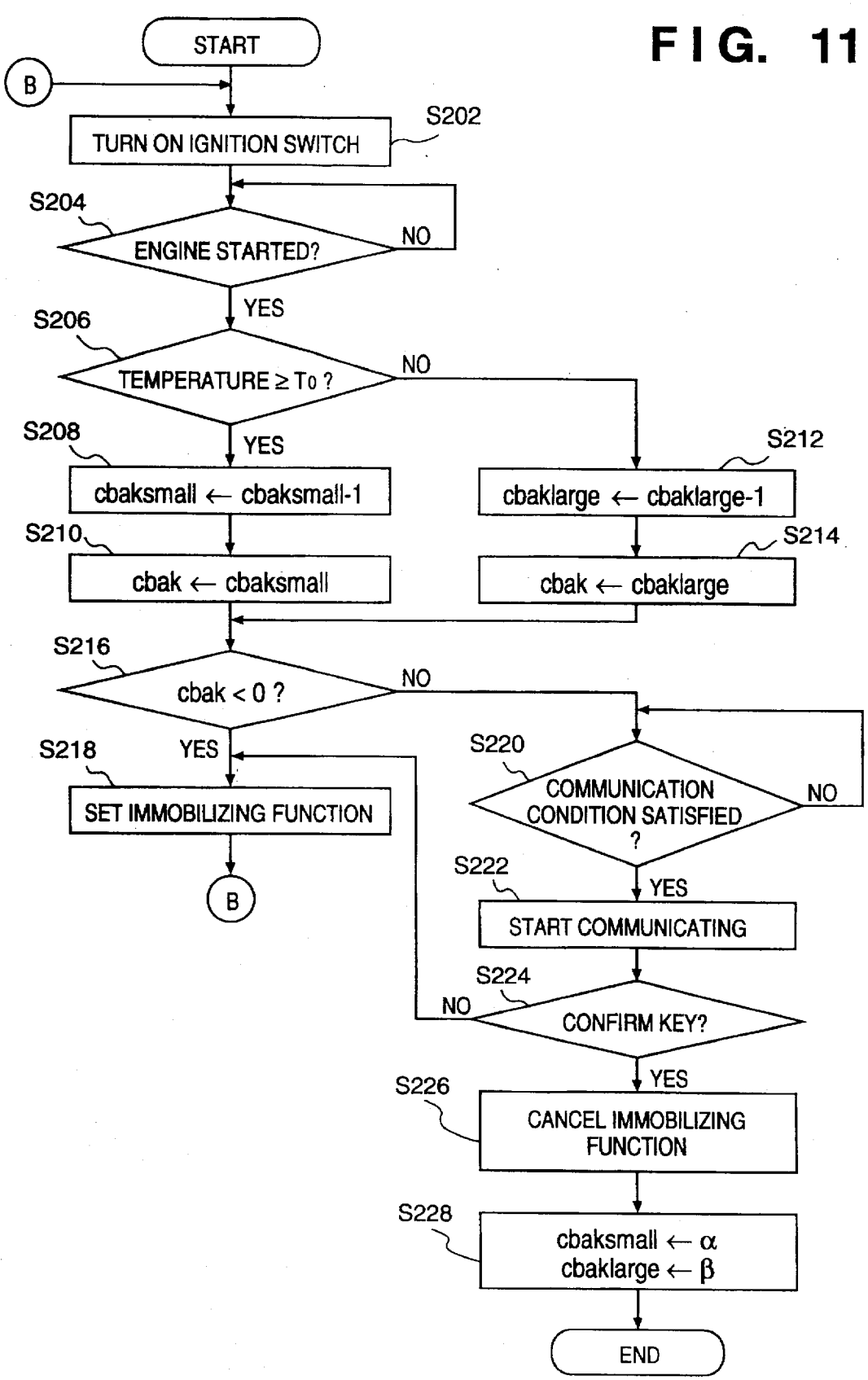
FIG. 11 is a flowchart showing anti-vehicle-thief verification procedure performed by the EGI unit by controlling ON/OFF of a power supply for the ignition switch.

In this embodiment, commitment of stealing the vehicle by operating ignition switch power supply as described above can be prevented by the following verification procedure shown in FIG. 11.

Referring to FIG. 11, after the ignition switch is turned on by using a key at step S202, the process proceeds to step S204 where whether or not the engine is moving is determined. If the engine is not moving, the process returns to the beginning of step S204, whereas if the engine is moving, then the process goes to step S206.

At step S206, whether the engine is warm or cold is determined by verifying whether the temperature of a radiator is greater than a predetermined value, T0. If the engine is warm (warm state), the process proceeds to step S208 and then to step S210, whereas if the engine is cold (cold state), the process goes to step S212 then to step S214.

Next, processes of the aforesaid steps in FIG. 11, "cbaksmall", "cbaklarge" and "cbak", will be described. Cbaksmall is a value for counting number of times which the ignition switch power supply is turned on and off during the code comparison period in the warm state. The cbaklarge is a value for counting number of times the ignition switch power supply is turned on and off during the code comparison period in the cold state. The cbak is a variable changed to the final value of the cbaksmall or the cbaklarge. The initial values of these cbaksmall and cbaklarge are respectively set to α and β for finding irregular operation by a thief at following step S228, in advance, and these values are stored in the backup RAM 17.

As for the number of times which the ignition switch power supply is turned on and off, it is incremented by 1 each time when the ignition switch power supply is turned on and off during the aforesaid code comparison. Note that the value counted each time when the ignition switch power supply is turned on and off can be stored in the backup RAM 17. Note that the time period for the code comparison should be sufficiently long so that the ignition switch power supply is turned on and off predetermined number of times, as described below.

More specifically, referring to FIG. 8, when a legal operation is performed by using a key at time t0, the ignition switch power supply changes from ON to OFF, and either the cbaksmall or the cbaklarge is decremented by one. Thereafter, if the ignition switch power supply is momentary changed ON to OFF during a regular code comparison time period, M0, then the actual code comparison time period becomes M1, either the cbaksmall or the cbaklarge is decremented by one, and code comparison is restarted at time t1. In a case where the ignition switch power supply is turned ON and OFF once more after the above code comparison, the code comparison time period is changed to M2, and the cbaksmall or the cbaklarge is decremented by one as well as the next code comparison is started at time t2. Further, in a case where the ignition switch power supply is turned on and off once more, the code comparison time period changed to M3, and the cbaksmall or the cbaklarge is decremented by one as well as the next code comparison is started at time t3. The number of times when the ignition switch power supply is momentarily ON and OFF is counted as described above.

In the aforesaid manner, during the warm state, each time when the ignition switch power supply is momentary turned ON and OFF during the code comparison time period, M1, M2, M3, . . . . (including a legal key operation), the cbaksmall is decremented from the initial value α, "cbaksmall-1" at step S208. Thereafter, at step S110, the cbak is changed to the final cbaksmall value.

Similarly, in the cold state, during the warm state, each time when the ignition switch power supply is momentary turned on and off during the time period for code comparison (M1, M2, M3, . . .) (including key-on operation as the regal operation), the cbaklarge is decremented from the initial value β, "cbaklarge - 1" at step S212. Thereafter, at step S214, the cbak is changed to the final cbaklarge value.

The initial values of the aforesaid cbaksmall and cbaklarge, α and β are both positive integers, and their relationship is β>α. Thus, the initial value in the cold state is set larger than the initial value in the warm state. The reason for this is as follow. Namely, when the key is inserted into the keyhole and the ignition switch is turned on and off, even if the key is moved to a position where the ignition switch is normally turned on, the ignition switch is kept OFF because of an effect of grease inside of the keyhole. The grease affects as above more frequently in the cold state when the grease is more viscous. Therefore, the initial values of the cbaksmall and cbaklarge, α and β are decided and set by taking the viscosity of the grease inside of the keyhole into consideration. As a result, the initial value of the cbak is larger when the engine is in the cold state than that when the engine is in the warm state. By setting the initial values of the cbaksmall and the cbaklarge as described above, even if bad connection is occurred because of the grease when the engine is in the cold state, which causes the ignition switch power supply to be mistakenly turned ON and OFF, the effects of the grease can be reduced.

After the value of the cbak is set at steps S210 and S214 as described above, the process proceeds to step S216 where whether the value of cbak is smaller than 0 or not is determined. If the cbak is smaller than 0, then the ignition switch power supply has been turned ON and OFF more than the predetermined number of times, set as the initial value, during a code comparison time period. In this case, there is a fear that a thief may be performing the ON and OFF operation. Therefore, if YES at step S216, the process proceeds to step S218 where the immobilizing function is set thereby causing the engine to stop.

On the contrary, if NO at step S216, the process moves to step S220 where whether communication conditions between the transponder 1, the immobilizer unit 4, and the EGI unit 9 are satisfied or not is determined. The method of determining whether the communication conditions are satisfied or not is well-known to those who are skilled in the art, and for example, the determination is performed by checking whether the communication line is busy or not. In a case where the communication conditions are not satisfied, the process returns to the beginning of step S220, whereas, in a case where the communication conditions are satisfied, the process proceeds to step S222 and communication starts.

Then, the process proceeds to step S224 where whether the used key is the right one or not is checked. The procedure of checking the key is substantially the same as the processes at steps S60 to S84 in FIGS. 6 and 7, thus explanations of the checking procedure is omitted.

Thereafter, if it is not possible to check the key or if it is determined the key is not the correct one, the process proceeds to step S218 where the immobilizing function is set so as to stop the engine. Whereas, if it is ensured that the used key is the correct one, the process moves to step S226 where the immobilizing function is canceled. Then, at step S228, the initial values α and β for the cbaksmall and cbaklarge are set in order to prepare for the next time to start the engine, and the routine is completed. Note that a normal engine control is performed (e.g., control of fuel injection) after the routine.

According to the anti-vehicle-thief apparatus according to the embodiment as described above, if a thief tries to steal a vehicle by repeating the code comparison by shutting down the ignition switch power supply by turning the key ON and OFF momentary during a code comparison time period so as to keep moving the engine, such the operation is detected and the number of times of the repeated operation is stored in the backup RAM. As a result it is possible to prevent vehicle from being stolen for sure, committed by performing operation to momentary turn ON and OFF the ignition switch power supply.

Further, the number of times that an operation to momentary turn ON and OFF the ignition switch power supply is performed, for example, is stored in the backup RAM 17 of the EGI unit 9 in the aforesaid embodiment, the backup RAM can be efficiently used. Furthermore, if a battery is turned off by a condenser, or the like, provided in the power supply of the EGI unit, since a static RAM is usually used as the backup RAM 17, which can keep information for a certain time period (about 10 msec. to 2 sec.), the theft commitment by a thief is prevented.

Furthermore, according to the aforesaid embodiment, even in a case where grease inside of the keyhole causes bad connection because of its viscosity when the engine is in the cold state, it is possible to prevent a vehicle from being stolen by a thief who performs an operation to momentary turn on and off an ignition switch power supply.

The present invention is not limited to the above embodiments and various changes and modifications can be made within the spirit and scope of the present invention.

For example, the anti-vehicle-thief apparatus of this embodiment is realized by the immobilizer unit and the EGI unit altogether, however, it is possible to constitute an apparatus performing entire process described above with either of above two units.

Further, a predetermined time for verifying ID codes can be set as desired, needless to say.

Therefore to appraise the public of the scope of the present invention, the following claims are made.

What is claimed is:

1. An anti-vehicle-thief apparatus comprising:
    code comparison means for comparing a first code received from a sending unit with a code stored in a receiving unit after an engine is started and, when the first code and the code stored in the receiving unit are identical, outputting a second code to an engine control means;
    said engine control means for comparing the second code to a code stored in said engine control means and, when the second code and the code stored in said engine control means are identical, permitting the engine to continue to operate;
    code comparison operation verification means, provided in said engine control means, for verifying whether or not it is possible to perform the code comparison by said engine control means after the engine is started; and
    engine stopping means for causing the engine to stop when a code comparison by the code comparison means or the engine control means determines that the codes are not identical, or a verification by the code comparison operation verification means verifies that it is not possible to perform code comparison.

2. The anti-vehicle-thief apparatus according to claim 1, wherein said engine stopping means causes the engine to stop when said code comparison can not be performed for a predetermined time period.

3. The anti-vehicle-thief apparatus according to claim 2, wherein said code comparison means is provided independently from said engine control means and is connected to said engine control means via a communication line.

4. The anti-vehicle-thief apparatus according to claim 1, wherein said code comparison operation verification means detects a state of a voltage of a power supply for a CPU of said engine control means.

5. The anti-vehicle-thief apparatus according to claim 4, wherein ON and OFF of a voltage of an ignition switch power supply for the CPU of said engine control means is coupled to ON and OFF of an ignition switch of a vehicle.

6. The anti-vehicle-thief apparatus according to claim 5, wherein said code comparison operation verification means detects that a CPU resetting operation performed by repeating momentarily turning ON and OFF the voltage of the power supply for the CPU of said engine control means is continued for more than a predetermined time period.

7. The anti-vehicle-thief apparatus according to claim 6, wherein said code comparison operation verification means detects that the CPU resetting operation to momentarily turn ON and OFF the voltage of the power supply for the CPU of said engine control means is performed more than a predetermined number of times.

8. The anti-vehicle-thief apparatus according to claim 7, further comprising storage means for storing a number of times that the voltage of the power supply for the CPU of said engine control means is turned ON and OFF.

9. The anti-vehicle-thief apparatus according to claim 8, wherein said storage means includes a backup RAM which is always connected to a battery, and stores a trouble code indicating whether any sensor connected to said engine control means has had any trouble or not.

10. The anti-vehicle-thief apparatus according to claim 8, wherein, when a temperature of a radiator is less than a predetermined value, said engine stopping means sets a value representing a predetermined number of times larger than a value set when the temperature of the radiator is greater or equal to the predetermined value.

11. The anti-vehicle-thief apparatus according to claim 1, wherein said code comparison operation verification means detects the state of a voltage of a communication line of the CPU of said engine control means and judges whether the communication with said code verification means is established or not.

12. The anti-vehicle-thief apparatus according to claim 11, wherein said code comparison operation verification means keeps said engine control means waiting for starting the code comparison when the communication with said code comparison means is not established, and judges whether the waiting time has passed a predetermined time period or not.

13. The anti-vehicle-thief apparatus according to claim 12, wherein said engine stopping means issues a first transmission request of the second code to said code comparison means so as to compare the second code to the code stored in said engine control unit, and, if the code comparison is not completed within a predetermined time period, then causes the engine to stop.

14. The anti-vehicle-thief apparatus according to claim 12, wherein said engine stopping means causes the engine to stop if said engine stopping means issues a transmission request of the second code to said code comparison means so as the compare the second code to the code stored in said engine control means, and if the code comparison is not completed after the transmission request is issued for more than a predetermined number of time.

15. The anti-vehicle-thief apparatus according to claim 11, wherein said code comparison means is provided independently from said engine control means and is connected to said engine control means via a communication line.

16. An anti-vehicle-thief apparatus comprising:

code comparison means for comparing a code received from a sending unit with a code stored in a receiving unit after an engine is started and, when the code received from the sending unit and the code stored in the receiving unit are identical, permitting the engine to continue to operate;

code comparison operation verification means, provided in said code comparison means, for verifying whether or not it is possible to perform the code comparison by said code comparison means after the engine is started; and engine stopping means for causing the engine to stop when a code comparison by the code comparison means determines that the compared codes are not identical or when a verification by the code comparison operation verification means verifies that it is not possible to perform code comparison.

17. The anti-vehicle-thief apparatus according to claim 16, wherein said engine stopping means causes the engine to stop when said code comparison can not be performed for a predetermined time period.

18. The anti-vehicle-thief apparatus according to claim 16, wherein said code comparison operation verification means detects a state of a voltage of a power supply for a CPU of said code comparison means.

19. The anti-vehicle-thief apparatus according to claim 18, wherein said code comparison operation verification means detects that a CPU resetting operation performed by repeating momentarily turning ON and OFF a voltage of a power supply for the CPU is continued for more than a predetermined time period.

20. The anti-vehicle-thief apparatus according to claim 19, wherein said code comparison operation verification means detects that the operation to momentarily turn ON and OFF the voltage of the power supply for the CPU is performed more than predetermined number of times.

* * * * *

UNITED STATES PATENT AND TRADEMARK OFFICE
CERTIFICATE OF CORRECTION

PATENT NO. : 5,684,454                  Page 1 of 15
DATED       : November 4, 1997
INVENTOR(S) : NISHIOKA et al.

It is certified that error appears in the above-identified patent and that said Letters Patent is hereby corrected as shown below:

Col. 1,      between lines 3 and 5 (below "BACKGROUND OF THE INVENTION"), insert --1. Field of the Invention--;

line 9, change "an" (2nd occurrence) to --a--;

between lines 11 and 12, insert --Description of the Related Art--;

line 32, delete "0"; change "started, then a" to --started. A--;

line 33, after "is" insert --then--; before "the" insert --and--;

line 35, change "Then, if" to --If--; before "the" insert --then--;

line 54, delete "to";

line 55, change "prevent" to --prevention of--;

line 65, change "prevent" to --present--.

Col. 2,      line 9, delete "or not";

line 17, change "apart" to --a part--;

line 63, change "embodiment" to --embodiments--.

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

Col. 3,     line 16, change "unit," to --unit 9,--;

line 23, change "as" to --to--;

line 24, change "to" to --as--;

line 25, change "provide" to --provided--;

line 31, change "unit." to --unit 9.--.

Col. 4,     line 6, change "unit." to --unit 9.--;

line 10, change "an" to --a--;

line 47, change "unit" to --unit 4--;

line 51, change "transponder" to --transponder 1--;
           line 52, after "determined" (first occurrence) insert --.--;
           line 59, after "the" insert --predetermined--;

line 61, change "S7" to --S6--; after "where" insert --it is determined whether a CW request is issued from the EGI unit 9,-- ; and delete "an indicator is turned on";

UNITED STATES PATENT AND TRADEMARK OFFICE
CERTIFICATE OF CORRECTION

PATENT NO. : 5,684,454  
DATED : November 4, 1997  
INVENTOR(S) : NISHIOKA et al.

Page 3 of 15

It is certified that error appears in the above-identified patent and that said Letters Patent is hereby corrected as shown below:

line 62, change "S6" to --S7 where an indicator is turned on--; change "they" to --the predetermined conditions--;

line 64, after "unit" insert --9--;

line 66, before "the" insert --after turning on the indicator,--.

Col. 5,        line 3, change "transponder." to --transponder 1.--;

line 4, after "where", insert --it is determined--; and after "whether", insert --or not--;

line 5, after "transponder" insert --1--;

line 6, delete "or not is determined"; change "it" to --an ID code--; and after "is" (second occurrence), insert --received from the transponder 1--;

line 11, after "EEPROM" insert --5--; and after "unit" insert --4--;

line 13, after "EEPROM" insert --5--; and after "unit" insert --4--;

line 15, after "RAM" insert --6--; change "unit," to --unit 4,--;

line 16, after "unit" insert --9--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

line 18, after "where" insert --it is determined--; and after "whether", insert --or not--;

line 19, delete "," (comma);

line 20, change "unit" to --unit 9.--; delete "or not is determined"; and after "there is" insert --a response to the ID code and CW transmission--;

line 22, after "unit" insert --9--;

line 23, after "transponder" insert --1--; and after "unit" insert --9--;

line 24, after "RAM" insert --6--; and after "unit" insert --4--;

line 25, change "EEPROM," to --EEPROM 5,--;

line 27, after "unit" insert --9--;

line 30, after "EEPROM" insert --5--; and after "unit" insert --4--;
    line 32, after "transponder" insert --1--;
    line 34, after "unit" insert --1--;
    line 38, after "unit" insert --4--;

line 39, change "unit," to --unit 9,--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

line 43, change "unit." to --unit 9.--;

line 45, after "transponder" insert --1--;

line 46, after "unit" insert --4--;

line 50, change "immobilizing" to --immobilizer--; and after "unit" insert --4--;

line 51, after "unit" insert --9---;

line 67, change "unit," to --unit 4,--.

Col. 6,    line 15, after "sponder" insert --1--;

line 18, after "transponder" insert --1--;

line 20, after "antenna" insert --2--; change "unit)," to --unit 4),--;

line 26, after "EEPROM" insert --5--; and after "unit" insert --4--;

line 28, change "S48," to --S46,--;

UNITED STATES PATENT AND TRADEMARK OFFICE
CERTIFICATE OF CORRECTION

PATENT NO.  : 5,684,454
DATED       : November 4, 1997
INVENTOR(S) : NISHIOKA et al.

It is certified that error appears in the above-identified patent and that said Letters Patent is hereby corrected as shown below:

line 31, change "unit." to --unit 9.--;

line 35, change "unit," to --unit 9,--;

line 39, after "unit" insert --4--;

line 40, change "unit." to --unit 9.--;

line 47, after "unit" insert --9--;

line 49, change "unit." to --unit 9.--;

line 52, after "unit" insert --9--;

line 54, after "unit" insert --4--;

line 55, after "where", insert --it is determined--; and after "whether" insert --or not--;

line 57, delete "conditions, or";

line 58, change "not is determined." to --conditions.--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

line 60, after "the" insert --predetermined--;

line 66, after "unit" insert --9--;

line 67, change "unit." to --unit 4.--.

Col. 7,       line 1, after "where" insert --it is determined--; and after "whether", insert --or not--;

line 3, after "unit" (first occurrence) insert --4--; and after "unit" (second occurrence), insert --9--;

line 4, after "unit" insert --4--;

line 9, after "where", insert --it is determined--; after "whether", insert --or not--; and after "EEPROM", insert --10--;

line 10, after "unit" insert --9--;

line 11, after "where", insert --it is determined--; and after "whether", insert --or not--;

line 12, after "RAM", insert --11--;

line 13, after "EEPROM" insert --10--; and after "unit" insert --9--; delete "or not is";

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

line 14, delete "determined";

line 19, after "unit" insert --4--;

line 23, after "unit" insert --4--;

line 30, after "unit" insert --9--;

line 31, after "unit" insert --4--;

line 33, change "transponder," to --transponder 1,--; and change "unit," to --unit 4,--.

line 34, after "unit" insert --9--;

line 35, after "unit" insert --4--;

line 36, after "transponder" insert --1--;

line 37, change "revolution" to --revolutions--;

line 47, after "unit" insert --9--;

line 50, after "unit" (first occurrence) insert --9--; change "unit." (second occurrence) to --unit 4.--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

Page 9 of 15

It is certified that error appears in the above-identified patent and that said Letters Patent is hereby corrected as shown below:

line 51, after "unit" (first occurrence), insert --9--; and after "unit" (second occurrence), insert --4--;

line 53, after "unit" insert --9--;

line 54, after "unit" insert --4--;

line 56, after "unit" insert --9--;

line 57, after "unit" (first occurrence) insert --4--; and after "unit" (second occurrence) insert --9--;

line 59, change "making" to --placing--; and change "be" to --in--;

line 66, after "unit" insert --9--.

Col. 8,        line 1, after "unit" insert --4--;

line 4, after "unit" (both occurrences) insert --9--;

line 5, change "unit." to --unit 4.--;

line 6, after "unit" insert --9--;

UNITED STATES PATENT AND TRADEMARK OFFICE
CERTIFICATE OF CORRECTION

PATENT NO. : 5,684,454  
DATED : November 4, 1997  
INVENTOR(S) : NISHIOKA et al.

It is certified that error appears in the above-identified patent and that said Letters Patent is hereby corrected as shown below:

line 7, change "unit," to --unit 4,--;

line 11, after "unit" insert --4--;

line 12, change "unit." to --unit 9.--;

line 13, change "makes" to --make--;

line 15, change "operation" to --operations--;

line 19, after "unit" insert --9--;

line 22, after "unit" insert --4--;

line 23, change "unit." to --unit 9.--;

line 27, after "unit" insert --9--;

line 29, after "EGI" insert --unit 9--; and change "unit," to --unit 4,--.

line 49, change "unit " to --unit 9,--; change "unit," to --unit 4,--;

line 50, change "respond" to --response--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

line 51, after "unit" insert --9--;

line 52, after "unit" insert --4--;

line 61, after "whether" insert --a flag--;

line 62, after "The" insert --flag--; and change "is a flag indicating" to --indicates--.

line 67, change "further" to --and,--.

Col. 9,     line 1, after "Further," insert --if--;

line 2, after "past," insert --the--;

line 25, change "revolution" to --revolutions--;

line 28, after "unit" insert --9--;

line 29, change "unit)" to --unit 4)--; and change "t-tid," to --t-tid$_2$,--;

line 37, after "unit" insert --9--;

line 38, change "unit)" to --unit 4)--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

line 48, after "unit" insert --9--.

line 49, after "unit" insert --4--;

line 50, after "unit" insert --9--;

line 52, after "unit" insert --4--;

line 56, change "step" to --process--;

line 58, after "Next", insert --,-- (comma); and after "S132,", insert --where--;

line 61, change "explanations" to --explanation--;

line 66, after "unit" (1st occurrence) insert --9--;

line 66, change "unit," to --unit 4,--.

Col. 10,     line 2, after "unit" insert --9--.

line 12, after "unit" insert --9--; and change "unit," to --unit 4,--;

line 15, change "have" to --9 has--;

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

Page 13 of 15

It is certified that error appears in the above-identified patent and that said Letters Patent is hereby corrected as shown below:

line 33, after "unit" (first occurrence), insert --4--; and after "unit" (second occurrence), insert --9--;

line 42, after "unit" insert --9--;

line 44, after "unit" insert --9--;

line 45, change "unit)," to --unit 4),--;

line 51, change "momentary" to --momentarily--.

line 62, after "unit" insert --9--.

Col. 11,     line 7, change "momentary" to --momentarily--;

line 34, after "counting" insert --a--;

line 37, after "counting" insert --the--;

line 54, after "off" insert --a--;

line 58, change "ON to OFF" to --OFF to ON--.

UNITED STATES PATENT AND TRADEMARK OFFICE
CERTIFICATE OF CORRECTION

PATENT NO. : 5,684,454
DATED : November 4, 1997
INVENTOR(S) : NISHIOKA et al.

It is certified that error appears in the above-identified patent and that said Letters Patent is hereby corrected as shown below:

Col. 12,    line 11, change "momentary" to --momentarily--.

line 18, "momentary" to --momentarily--;

line 20, change "regal" to --legal--;

line 28, change "follow" to --follows--.

line 41, change "is occurred" to --occurs--.

Col. 13,    line 21, change "momentary" to --momentarily--;

line 25, after "prevent" insert --the--;

line 28, change "momen-" to --momentarily--;

line 29, delete "tary";

line 34, change "unit," to --unit 9,--;

line 43, change "momentary" to --momentarily--;

UNITED STATES PATENT AND TRADEMARK OFFICE
CERTIFICATE OF CORRECTION

PATENT NO. : 5,684,454　　　　　　　　　　　　　　　　Page 15 of 15
DATED　　　: November 4, 1997
INVENTOR(S) : NISHIOKA et al.

It is certified that error appears in the above-identified patent and that said Letters Patent is hereby corrected as shown below:

line 49, after "unit" insert --4--;

line 50, after "unit" insert --9--.

Signed and Sealed this

Fourth Day of August, 1998

*Attest:*

BRUCE LEHMAN

*Attesting Officer*　　　　　*Commissioner of Patents and Trademarks*